No. 715,027. Patented Dec. 2, 1902.
J. C. CRIMINS.
STORM APRON.
(Application filed Sept. 15, 1902.)
(No Model.) 2 Sheets—Sheet 1.
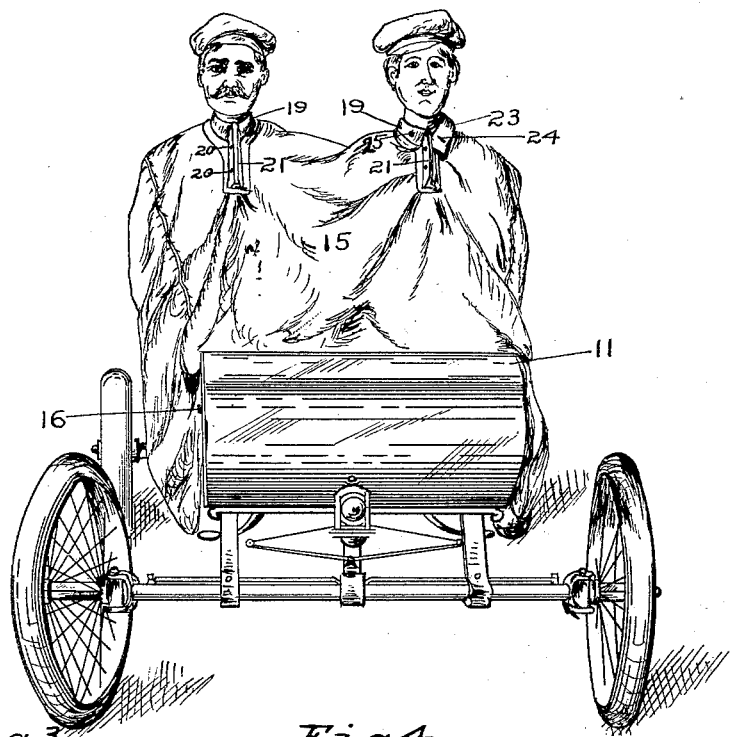
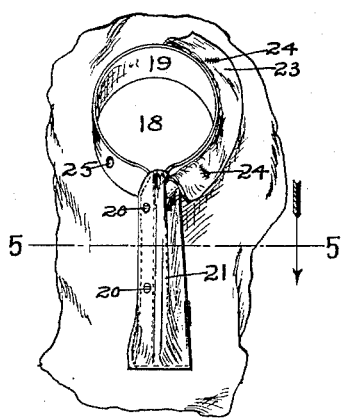
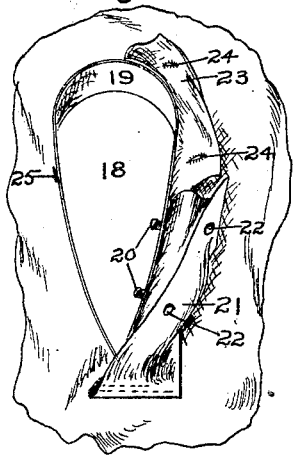
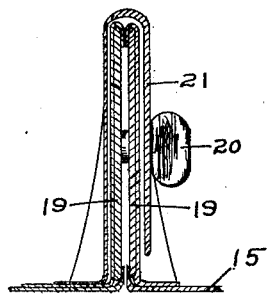
WITNESSES: H. J. Pearce
Nellie Allemong.
INVENTOR
John C. Crimins
BY
V. H. Lockwood
ATTORNEY No. 715,027. Patented Dec. 2, 1902.
J. C. CRIMINS.
STORM APRON.
(Application filed Sept. 15, 1902.)

(No Model.) 2 Sheets—Sheet 2.

WITNESSES: INVENTOR
H. J. Pearce John C. Crimins
Nellie Allemong BY
W. H. Lockwood
ATTORNEY

UNITED STATES PATENT OFFICE.

JOHN C. CRIMINS, OF INDIANAPOLIS, INDIANA.

STORM-APRON.

SPECIFICATION forming part of Letters Patent No. 715,027, dated December 2, 1902.

Application filed September 15, 1902. Serial No. 123,452. (No model.)

*To all whom it may concern:*

Be it known that I, JOHN C. CRIMINS, of Indianapolis, county of Marion, and State of Indiana, have invented a certain new and useful Storm-Apron; and I do hereby declare that the following is a full, clear, and exact description thereof, reference being had to the accompanying drawings, in which like numerals refer to like parts.

The object of this invention is to provide a storm-apron adapted especially for automobiles and similar vehicles where it is inconvenient or impossible to use umbrellas.

One feature consists in the combination, with a vehicle-bed, of a storm-apron that fastens closely about the neck of the wearer and the front is attached to the dashboard, while the rear portion drops behind the back of the seat of the vehicle.

Another feature consists in providing a storm-apron of the kind described for two persons and providing one of the neck-openings with a flap for closing it water-tight when the storm-apron is used by only one person.

Another feature of the invention consists in the particular arrangement of the means for closing the neck-opening, whereby it will be secured water and wind tight.

These features of the invention will more fully appear from the accompanying drawings and the following description and claims.

Figure 2:
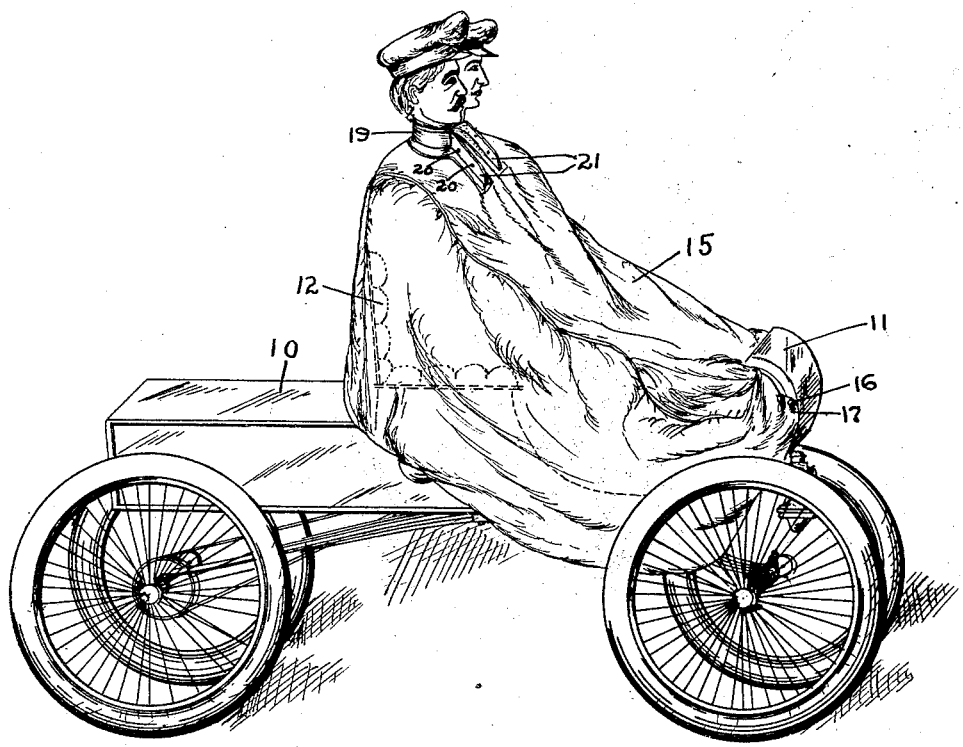
Figure 6:
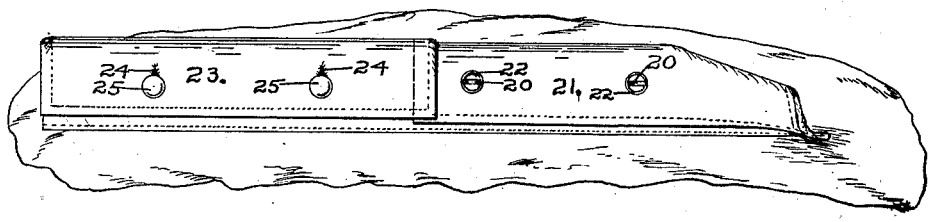

In the drawings, Figure 1 is a front elevation of an automobile with said storm-apron in use. Fig. 2 is a side elevation thereof. Fig. 3 is a plan view of a portion of the apron, showing one neck-opening closed in position around the neck of the wearer. Fig. 4 is the same with the neck-opening open. Fig. 5 is a section on the line 5 5 of Fig. 3 on an enlarged scale. Fig. 6 is a side elevation of what is shown in Fig. 3 with the neckband flattened together or closed.

In the drawings, 10 represents the bed of the vehicle, 11 the dashboard, and 12 the seat-back in dotted lines.

15 represents the storm-apron, which is detachably secured to buttons 16 on the dashboard extending through elongated slots 17 of the apron, whereby the apron may be readily detached.

The apron falls down behind the seat-back 12 and outside the ends of the seat, so that in a rapidly-moving automobile it will be fully protective.

In automobile use it is necessary that the apron fit closely and tightly about the neck. For that purpose suitable neck-openings 18 are provided, one for each occupant of the vehicle. Around the neck-opening there is a collar 19. The apron is slit down several inches to have a breast-opening large enough for the insertion of the head of the wearer. The collar 19 extends down on each side of said breast-opening to form a stiff vertical strip. (Shown in Fig. 5.) The strips on each side of the breast-opening are secured together by fasteners 20 on one strip extending through corresponding eyes in the other. Then a flap 21 is secured on one side of the breast-opening and is wide enough to extend over said strips when united and has eyes 22 for engaging the fasteners or buttons 20, as shown in Fig. 6. On the two lower ends of the collar are strips on each side of the breast-opening, one closed, making a rigid upward extension, as shown in Fig. 5, and the addition of the flap 21, enveloping them, as there shown, enables the breast-openings to be closed wind and water tight. The flap 21 is secured at its lower end transversely beyond each side of the breast-opening. I add to one of the collars the flap 23, secured on one side, as shown in Fig. 4, that is like the flap 21, provided with eyes 24, that engage buttons 25, as shown in Fig. 6. When not in use, the flap 23 overlaps the flap 21, as shown. The object of this arrangement is to close water-tight one of the neck-openings when there is only one person in the carriage, so that no water will enter at that opening. All of the neck-openings in the apron should be provided with this flap 23, excepting one, and that does not need it, as there will be at least one person using the apron, and this flap 23 is only for neck-openings not in use.

What I claim as my invention, and desire to secure by Letters Patent, is—

1. A storm-apron adapted to envelop the upper part of the body of an occupant of a vehicle provided with a neck-opening to enable the apron to be placed about the neck of the wearer, a collar-strip along the edge of said opening, means for closing the lower part of the neck-opening, and a flap secured to one side of the upper portion of the collar-strip and adapted to cover and close the upper portion of the neck-opening.

2. A storm-apron adapted to envelop the upper part of the body of an occupant of a vehicle and provided with a neck-opening to enable the apron to be placed about the neck of the wearer, a collar-strip extending along the edge of said opening, a flap secured to one side of the upper portion of the collar-strip and adapted to cover and close the upper portion of the neck-opening, means for detachably securing said flap in a closed position, and independent means for closing the lower part of the neck-opening.

3. A storm-apron adapted to envelop the upper part of the body of the occupant of a vehicle and provided with a neck-opening to enable the apron to be placed about the neck of the wearer, a collar-strip extending along each side of said opening, a flap for enveloping the front lower portions of said collar-strips when united, and means for holding such lower parts of the collar-strips and said flap together.

In witness whereof I have hereunto affixed my signature in the presence of the witnesses herein named.

JOHN C. CRIMINS.

Witnesses:
NELLIE ALLEMONG,
H. I. PEARCE.